United States Patent [19]
Tamburello et al.

[11] Patent Number: 5,267,073
[45] Date of Patent: Nov. 30, 1993

[54] AMPLIFIER ADAPTER FOR OPTICAL LINES

[75] Inventors: Mario Tamburello, Vimercate; Giorgio Grasso, Monza, both of Italy

[73] Assignee: Pirelli Cavi S.p.A., Milan, Italy

[21] Appl. No.: 957,623

[22] Filed: Oct. 6, 1992

Related U.S. Application Data

[63] Continuation of Ser. No. 605,558, Oct. 29, 1990, abandoned.

[30] Foreign Application Priority Data

Oct. 30, 1989 [IT] Italy .................... 22185 A/89

[51] Int. Cl.⁵ .................. H04B 10/16; H04B 10/00
[52] U.S. Cl. .................. 359/179; 359/152; 359/164; 372/38
[58] Field of Search ............... 359/152, 164, 173, 174, 359/176, 179, 187, 194; 372/38

[56] References Cited

U.S. PATENT DOCUMENTS

| | | | |
|---|---|---|---|
| 3,770,966 | 11/1973 | Sagawa et al. | 250/205 |
| 4,295,225 | 10/1981 | Pan | 359/179 |
| 4,534,064 | 8/1985 | Giacometti et al. | 455/601 |
| 4,546,476 | 10/1985 | Shaw et al. | 372/6 |
| 4,680,809 | 7/1987 | Hartkopf et al. | 455/601 |
| 4,886,334 | 12/1989 | Aoki | 350/96.16 |
| 4,887,309 | 12/1989 | Andersson et al. | 455/601 |
| 4,972,513 | 11/1990 | Mochizuki et al. | 455/601 |

OTHER PUBLICATIONS

Tomimori et al. Fujitsu Scientific & Technical Journal vol. 22, No. 4, pp. 283-293.

*Primary Examiner*—Richard E. Chilcot, Jr.
*Assistant Examiner*—K. Negash
*Attorney, Agent, or Firm*—Brooks Haidt Haffner & DeLahunty

[57] ABSTRACT

Adapters for interconnecting optical fiber lines, including optical amplifiers, with optical transmitters and receivers in which the operating parameters of the optical amplifiers are different from the operating parameters of the transmitters and receivers. The adapters convert the optical signals from a transmitter to those within the operating parameters of the optical amplifier and convert the optical signals from an optical amplifier to those within the operating parameters of the receiver. The adapter receiving the optical signals from the transmitter also has provision for inserting service signals and the adapter receiving signals from an optical amplifier has provision for separating the optical signals from the service signals. Also, switching devices for changing transmitters and/or receivers or lines in the event of component failures.

17 Claims, 2 Drawing Sheets

AMPLIFIER ADAPTER FOR OPTICAL LINES

This application is a continuation of application Ser. No. 07/605,558, filed Oct. 29, 1990 now abandoned.

BACKGROUND OF THE INVENTION

1. Field of the Invention

The present invention relates to an adapter for amplifiers in optical lines of the type comprising at least an optical line transmitting apparatus provided with a laser, and an optical line receiving apparatus between which the corresponding optical line amplifiers are interposed.

2. Description of the Prior Art

It is known in the field of optical fiber telecommunication lines that it is very difficult to insert in the line optical amplifiers the parameters of which are compatible with the respective optical parameters of the optical line transmitters and receivers.

This results from the fact that the characteristics required of the optical line amplifier, that is, transmission speed, wavelength and variation of the latter depending upon the working temperature, are different from those normally used by common optical line transmitting and receiving apparatus.

More specifically, it would normally be necessary each time to design a particular circuit configuration, adapted to the parameters of the optical line amplifier and specific to the transmission speed of that line. In terms of operation, this means that it is necessary to make an electrical circuit board in which the related parameters have been adjusted depending upon the specific transmission speed.

In addition, the wavelength control circuits, depending upon the specific temperature which is related to that optical line amplifier, should also be on the same board.

Moreover, difficulties arise in carrying out the electrical connection to said electrical boards present in the transmitter and in the receiver, of the corresponding conversion circuit section arranged in the optical amplifiers, when a given transmission speed threshold equal to 565 megabits is exceeded.

These types of problems, as regards the laser providing the output of the optical transmitter and the corresponding input of the optical receiver related to the receiving apparatus, also give rise to a series of further restrictions due to the fact that the circuitry currently used in transmitting and receiving apparatus does not provide a circuit connection of the analog type for the service channels coupled to the same optical line.

In short, while in known and in currently experimental embodiments, a circuit compactness criterion has been developed in order to limit the number of components and make the interfacing boards mounted at the transmitting and receiving apparatus of the optical fiber lines reliable, it is obvious that, when optical line amplifiers have to be connected in the line, said amplifiers are structurally incompatible with the circuitry normally present in the corresponding optical transmitting and receiving apparatus, due to their operating parameters.

That is to say, when normal transmitting/receiving apparatus is used, the signal on the optical line undergoes alterations greatly modifying the nature of the signal itself in the presence of optical amplifiers.

These restrictions represented by the above-mentioned parameters also constrain one to adopt a variety of circuit solutions, each of them being exclusively limited to the selected operating parameters for that line and meeting the requirements of the optical line amplifiers present on the line itself.

This is mainly due to the peculiarity of the optical line amplifiers which must work within given wavelength ranges, within given wavelength variation limits depending upon temperature, and for any value of the transmission speed.

In fact, as a result of the foregoing, normal optical line receivers have problems with frequency response when they are coupled to optical amplifiers in optical fiber lines.

Taking into account only this series of difficulties due to the parametric restrictions and to the problems concerned with the electrical connections between the optical detector and the related circuitry of the optical line apparatus, attempts have been first made to accomplish a number of solutions each offering predetermined parameters.

It appears obvious, however, that this method is very intensive as regards planning, very expensive and disadvantageous from an industrial point of view.

SUMMARY OF THE INVENTION

The main object of the present invention is to eliminate the above drawbacks relative to the currently used solutions, by providing an adapter for optical lines with amplifiers in which an independent and universal connection between the optical line amplifier and the corresponding transmitting and receiving apparatus is possible without varying the internal circuitries of said apparatus.

Advantageously, said adapter allows the normal transmitting and receiving apparatus presently on the market to be used and, due to its compactness, ensures a simple construction and good reliability of the connection itself. The invention also enables protection measures against failures in the apparatus and/or amplifiers in the field of optical fiber lines provided with the amplifiers, which protection measures are normally provided in ordinary lines although they are not of the optical fiber type.

Further features and advantages will become more apparent in the course of the following description according to the present invention of an adapter for optical lines with amplifiers of the type which comprises at least an optical line transmitting apparatus provided with a laser, and an optical line receiving apparatus between which the corresponding optical line amplifiers are interposed, wherein the adapter includes an optical fiber connection both at the input and at the output. Both on the transmitting apparatus side and on the receiving apparatus side, said adapter comprises one optical-to-electric converter module adapted to give an electrical signal at the output, the level of which corresponds to the input variations of the optical signal which then enters a second adjustment module for a further laser, so as to generate an optical output signal which is adjusted according to the parametric requirements of each optical line amplifier.

BRIEF DESCRIPTION OF THE DRAWINGS

Further features and advantages of the invention will be best understood from the detailed description of a preferred embodiment of an adapter for amplified optical lines given hereinafter by way of a non-limiting example with reference to the accompanying drawings, in which.

DESCRIPTION OF THE PREFERRED EMBODIMENTS

Figure 1:
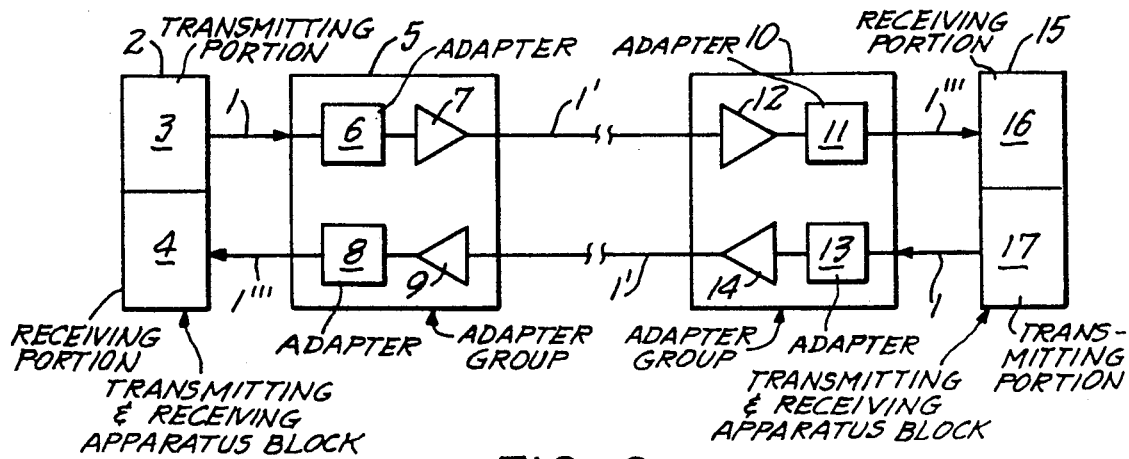
FIG. 1 is a general block diagram of an optical fiber line in particular showing the adapters connected to the respective transmitting and receiving apparatus and to the corresponding optical line amplifiers, in accordance with the present invention.

Referring to FIG. 1, the reference number 1 denotes an optical fiber line in which an apparatus block 2 and an apparatus block 15 are present, each of them including a transmitting portion, 3 and 17 respectively, and a receiving portion, 4 and 16 respectively, each of a known type.

When optical amplifiers, represented by blocks 7, 9, 12 and 14 in FIG. 1, need to be installed on the line it is convenient to mount, together with them, adapters in accordance with the present invention, represented in the figure by blocks 6, 8, 11 and 13 which are then gathered to form groups 5 and 10 for schematization purposes. The adapters 6 and 13 are alike, and the adapters 8 and 11 are alike. Therefore, only the adapters 6 and 8 will be described in detail.

Obviously it is not necessary that each adapter 6 and the respective amplifier 7, for example, by physically located together in the same housing so that the presence on the line of optical amplifiers variously disposed according to the line sizes is also possible.

Figure 2:
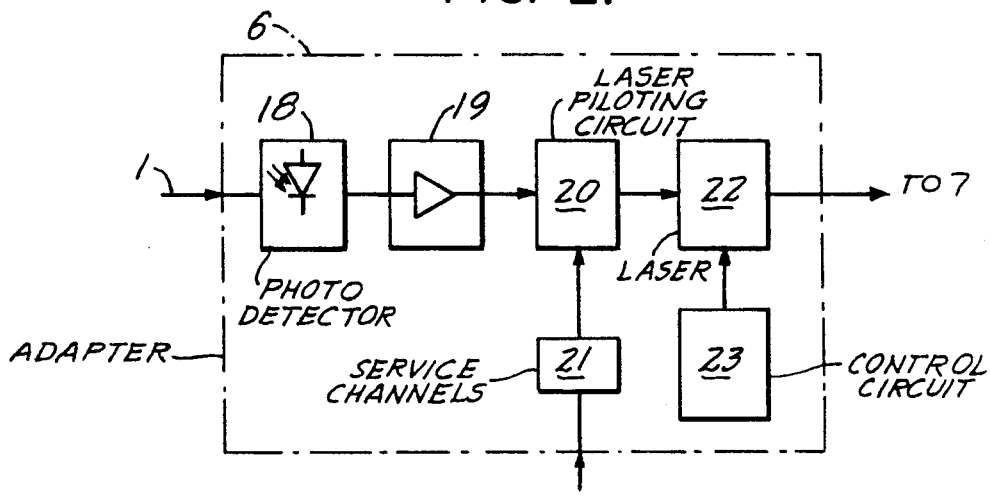
FIG. 2 is a block diagram specifically illustrating the adapter for amplified optical lines in accordance with the present invention, at the line transmitter side.

Referring to FIG. 2 in which the adapter 6 of the transmitting side is shown, it will be apparent that the optical signal coming from the transmitter 3 on the first optical line 1 enters the adapter 6 through a converting means comprising a photodetector 18 representing the input of the optical-to-electric converter module.

The output of photodetector 18, which can be a photodiode for example, provides an electrical signal entering an electrical automatic control amplifier 19, automatically controlling the voltage level within a determined range and part of the converting means.

In this way an electrical signal is obtained at the output of the photodetector 18, the level of said signal corresponding to the input variations of the incoming optical signal.

Said electrical signal enters an adjusting means comprising a laser piloting circuit 20, which in turn actuates a laser 22 in the adapter 6 converting said electrical signal to an optical signal, said optical signal having the wavelength of the optical signal generated by said laser 22 modulated by the piloting circuit 20.

The laser piloting circuit 20 is a known circuit of the digital type in which direct current modulation is also carried out in order to allow signals coming from service channels connected to the input to be inserted at the input thereof through corresponding analog circuit input gates 21.

The resulting optical signal issued by the adapter laser 22 is controlled in wavelength through the known type of control circuit 23, controlling the wavelength depending upon temperature, so as to ensure that the laser signal wavelength is independent of the operating temperature of the line.

This control of the wavelength is of the analog type and must correct for temperature variations lower than one degree and essentially serves to control the wavelength so that it has a value meeting the parametric requirements of the optical line amplifier 7 to which the adapter 6 is connected through an optical connection. The output of the amplifier 7 is connected to a second optical fiber line 1'.

Figure 3:
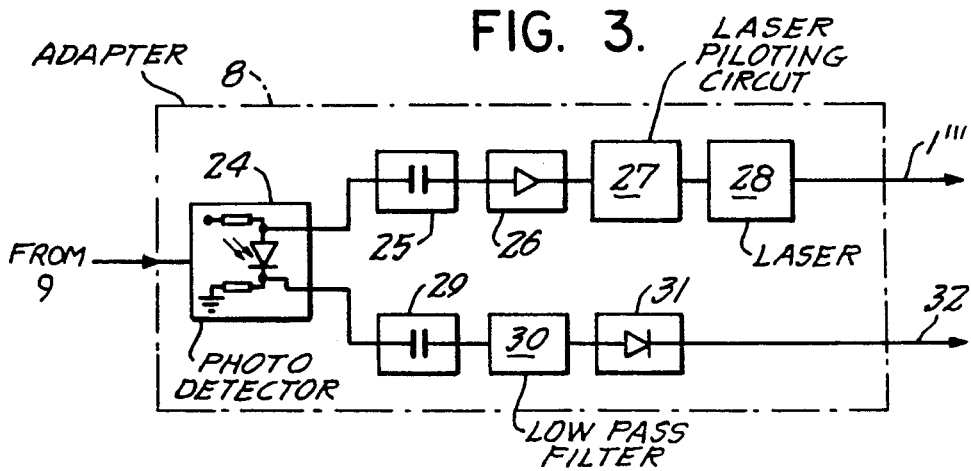
FIG. 3 is a block diagram of the adapter of the invention at the receiver side.

The optical adapter 8 at the receiving side is shown in FIG. 3 and is, therefore, connected to the receiving apparatus 4.

Entering this adapter 8 is the signal coming from the amplifier 9 which receives the signal from a second optical fiber line 1' and which is converted by a photodetector 24 to outputs which are directed to two circuit branches each AC coupled through a capacitor represented in the respective branches by capacitor 25 and capacitor 29.

In the upper branch, where the capacitor 25 is located, the converted electric signal undergoes an amplification through an electrical automatic control amplifier 26, automatically controlling the voltage level.

Optionally said amplification also contemplates cascade amplifiers depending upon the level one wishes to achieve.

At the output of the amplifier 26 automatically controlling the voltage level, the electrical signal then enters a known type of piloting circuit 27 for a laser 28 of the adapter 8.

The piloting circuit is a mere analog circuit and serves to activate, according to a determined wavelength, the adapter laser 28 of an ordinary type.

In this manner, at the output of the laser 28, there is an optical signal reflecting the input variations of the signals received by the photodetector 24 which latter optical signal is supplied to the receiving portion 4 or 16 by a third optical fiber line 1'''.

In the other branch, at the output of the photodetector 24 and the capacitor 29, a low-frequency filter 30 is provided as well as a normal electrical amplifier 31 for analog connection to the service channels' connection line 32.

Operation of the adapters according to the invention described above, mainly with respect to structure but also in the context in which they work, is as follows.

The characteristic feature in accordance with the present invention resides in that the signal entering the adapter 6 and the signal coming out of the same is always an optical signal which, however, reflects the parametric requirements of the corresponding optical amplifier 7 feeding the optical line 1'.

Obviously, this statement is valid both at the transmission and at the reception ports and for each optical amplifier connected to the optical line 1. When an optical signal is sent from the optical transmitting apparatus 3 through the optical fiber line 1, this signal enters the photodetector 18 of the adapter 6 and is converted to an electrical signal.

The electrical signal enters the automatic voltage level-controlling amplifier 19 which allows the changes of the optical input signal to be followed, keeping appropriate output voltage levels.

The electrical signal activates the piloting circuit 20 for the adapter laser 22 which is a laser which operates at a wavelength determined by the inherent inner configuration of the laser 22 itself. Circuit 20 is entirely digital and has a circuit portion carrying out direct current modulation for the contemplated input of the signals coming from the so-called service channels and for which a gate must be arranged, that is an analog-type input.

The laser 22, of a selected wavelength, then provides an optical output which has parametric characteristics independent of the laser present in the transmitter 3 and also corresponds to the operating requirements of the optical line amplifier 7.

Obviously this optical signal has also been controlled through the control circuit 23 which controls the wavelength depending upon temperature and which carries out a fine-selection control for variations lower than one degree for a very restricted optical spectrum on the order of Angstroms.

Such circuit 23 is an analog circuit and the adapter laser present in block 22 must be a laser of a higher performance if it is used in long-haul optical lines.

On the reception side, the photodetector 24 acts as an optical-to-electric signal converter and, receiving the optical signal from the optical amplifier 9, converts it to an electrical signal. The photodetector 29 includes two branches at the output. One branch, through an AC coupling capacitor 25, follows the same procedure as the conversion portion present on the transmitter side of the conversion module 6 with blocks 18 and 19, that is, through the capacitor 25, inputs a signal to the electric automatic voltage level-controlling electric amplifier 26, which amplifier has an electrical signal output which follows the input variations of the corresponding optical signal.

The electrical signal output of the amplifier 26 enters a piloting circuit 27 of an adapter laser 28. This circuit 27, unlike its corresponding circuit 20 on the transmission side, has completely analog circuitry, since it must carry out a type of selection different from the circuit 20. In the same manner as before, the laser is of a type available on the market and does not contemplate any control concerning the variation of the wavelength depending upon temperature, and the wavelength selection is not fine. At the output of this adapter laser 28, there is an optical signal which, through the optical line 1, enters the receiving apparatus 4 which emits an electrical signal.

At the other output branch of the adapter's photodetector 24, on the reception side thereof, there is another AC capacitor or coupler 29 which couples the optical signal converted by the photodetector 24 to an electrical amplifier 31 from which an electrical signal then issues which is connected to the service channels' connections through line 32.

Such signal coming from the photodetector 24, after being coupled through the capacitor 29, is also fed through a low-pass filter referenced by numeral 30 in FIG. 3 and designed to filter low frequencies.

In this way, independence has been achieved from the parametric characteristics of the transmitting and receiving line apparatus, since the adapter illustrated carries out the conversion to electrical signals of the signals in transit on the optical line through appropriate processing as above stated while keeping the parametric characteristics thereof which are necessary for the operating requirements of the optical amplifiers.

Thus the invention attains the intended purposes.

In fact, the foregoing statements are valid for each optical line amplifier, both on the transmission side and the reception side, and allows the parameters thereof to be enhanced without being obliged to change the circuitry present in the optical transmitting and receiving apparatus, which optical apparatus can be coupled to the amplifiers when the latter are connected to the optical fiber lines without further modifications.

Advantageously provision is also made for service protection in case of failure, which is always needed in communication lines.

Figure 4:
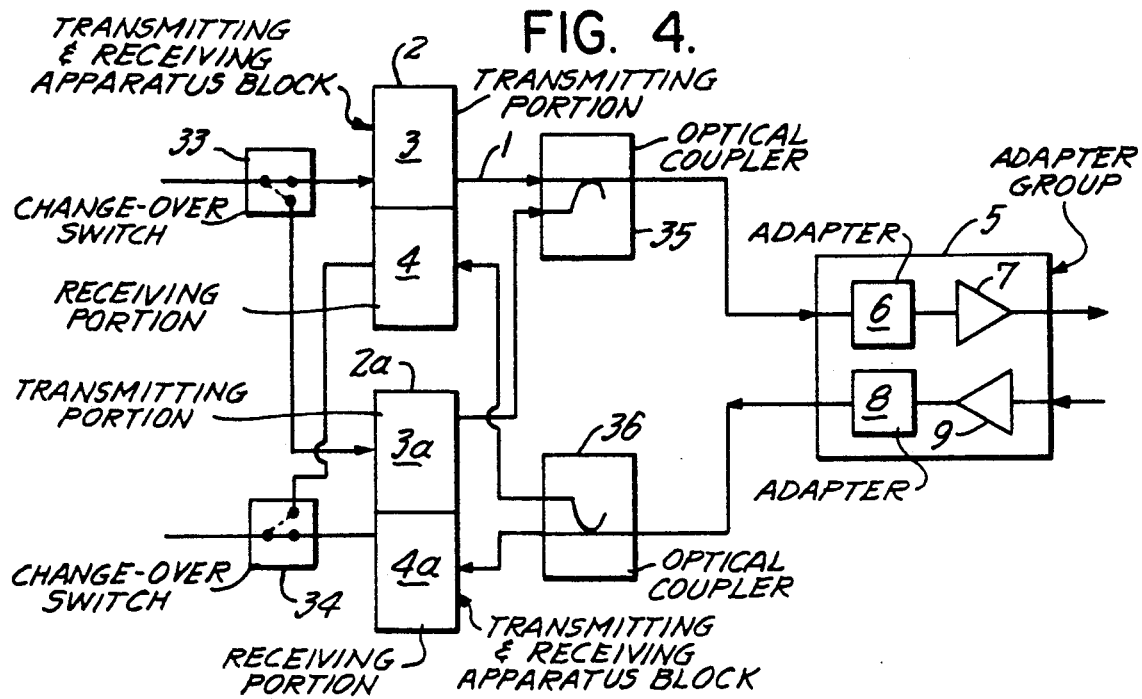
FIG. 4 is a schematic diagram of a protection circuit for optical lines with amplifiers and using adapters in accordance with the invention.

According to one form of service protection shown in FIG. 4, in a single optical line, it is possible to couple two apparatuses, referenced by 2 and 2a, in which the transmitting portions and the receiving portions identified by 3 and 4 and 3a and 4a respectively, are present, to an adapter block (generally identified by numeral 5 for the sake of uniformity with the preceding figures) provided with the optical transmitting and receiving amplifiers 7 and 9 in the region of the respective adapters 6 and 8, through an optical coupler 35 on one side and another similar coupler 36 on the other side.

By suitable change-over switches, identified by numerals 33 and 34 in FIG. 4, it is possible to switch over a receiving/transmitting apparatus group when the other is out of order, by using the same line on which the optical amplifiers 7 and 9 are installed and merely switching over the switches 33 and 34 at the time at which one of the two receiving/transmitting apparatuses ceases to work.

For example, a transmitter 3 which becomes non-operational is deactivated by switching over the electrical switch 33 to the other side, either automatically or manually, and subsequently using the optical coupler 35 so as to exploit the corresponding transmitter 3a of the apparatus 2a.

Likewise, it is possible to carry out the same reverse operation for the receivers.

In this way, it is possible to have protection when a receiving/transmitting apparatus group ceases to operate.

Figure 5:
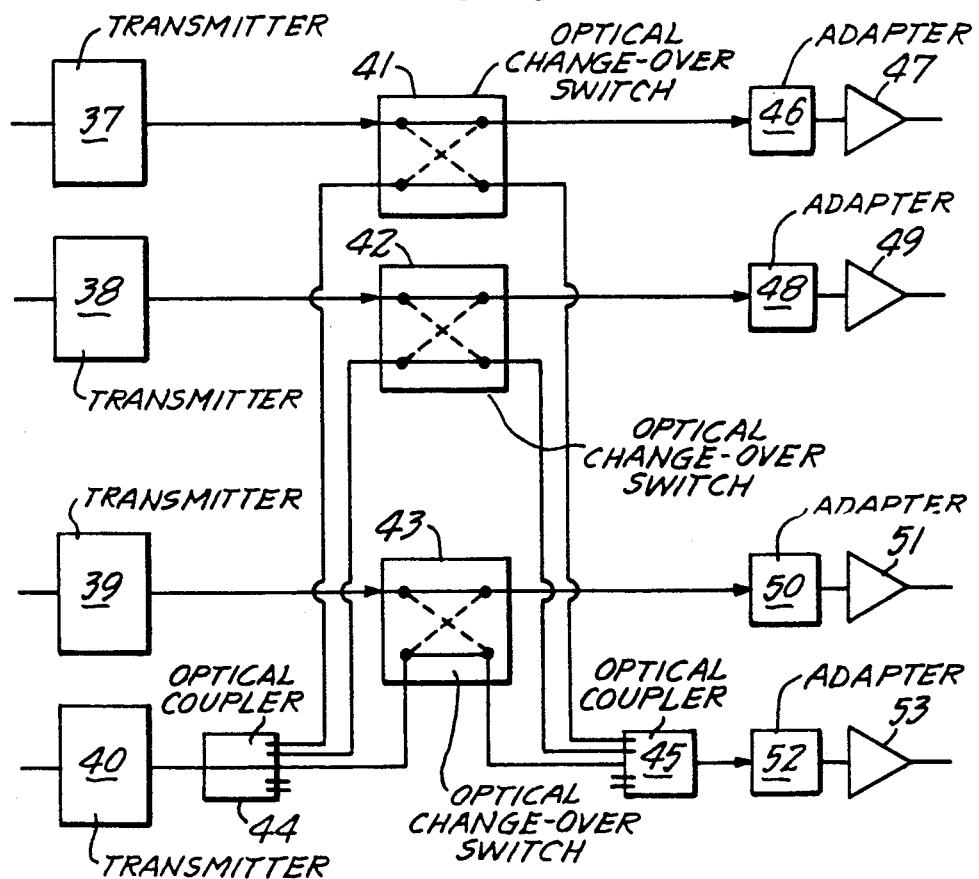
FIG. 5 is a schematic diagram of a further protection circuit for optical lines with amplifiers and using adapters in accordance with the invention.

A further advantage is achieved by another configuration shown in FIG. 5, in which there are a number of transmitters 37, 38 and 39 optically coupled to optical amplifiers 47, 49 and 51 through adapters 46, 48 and 50 plus an additional transmitter 40 optically coupled to a further optical amplifier 53 through a further adapter 52.

In this manner, by use of optical change-over switches 41, 42 and 43 as well as an optical coupler 44 and a further optical coupler 45, it is possible to switch over any transmitter to the additional optical line in which the adapter group 52 and the corresponding amplifier 53 are present, when any line, the one in which the amplifier 47 with the adapter 46 are connected, for example, stops working.

Generally, it is possible to do a switching operation when a transmitter stops working and it is necessary to switch an operative transmitter over to another line with an optical amplifier and the respective adapter.

In short, there is a reciprocity according to which, whether it is a transmitter that stops working or the corresponding amplifier with the respective adapter stops working, in accordance with the present invention it is possible to carry out the switching over to an "nth" line which, in FIG. 5, has been represented by the line provided with apparatus 40 and amplifier 53 with the respective adapter 52.

By obvious circuits similar to those shown in FIG. 5, the same reciprocity is available when receiving apparatus in optical lines are involved.

Obviously other variations and modifications concerning structure and parameters are possible using the principles of the present invention.

The embodiments of the invention in which an exclusive property or privilege is claimed are defined as follows:

1. An optical signal transmission system which includes a first optical signal laser transmitter having first operating parameters connected to a first optical fiber line for the supply of optical signals to said first optical fiber line, a second optical fiber line, an optical signal receiver, interconnecting means connected to said optical signal receiver and connected to said second optical fiber line for receiving optical signals from said second optical fiber line and supplying optical signals to said optical signal receiver and a first optical signal amplifier connected to said second optical fiber line for supplying optical signals to said second optical fiber line, said amplifier having second predetermined operating parameters different from said first predetermined operating parameters, and a first adapter interconnecting said first optical fiber line with said amplifier, said adapter comprising:

first converting means for converting optical signals to electrical signals connected to said first line for converting the optical signals received from said first transmitter by way of said first line into electrical signals corresponding to said optical signals;

a second optical signal laser transmitter connected to said optical amplifier for supplying optical signals to said optical amplifier; and an adjustment module comprising laser piloting means connected to said converting means and to said second transmitter for controlling said second transmitter by said electrical signals within said operating parameters of said optical amplifier.

2. An optical signal transmission system as set forth in claim 1 wherein said converting means comprises a photodetector optically coupled to said first line and an electrical automatic control amplifier for automatically controlling the voltage level of signals received thereby within a predetermined range, said electrical automatic control amplifier connecting said photodetector to said adjustment module.

3. An adapter as set forth in claim 1 further comprising temperature responsive, wavelength control means connected to said second optical signal laser transmitter for maintaining the wavelength of the optical signal emitted by said second transmitter at substantially a predetermined wavelength.

4. An adapter as set forth in claim 1 further comprising analog circuit input gates connected to said laser piloting means for supplying service signals thereto.

5. An optical signal transmission system as set forth in claim 1 wherein said interconnecting means comprises a second optical amplifier and a second adapter, said second optical amplifier being connected to said second optical fiber line and said second adapter comprising a second one of said converting means connected to said second optical amplifier, a third optical signal laser transmitter, a laser piloting circuit connected to said second one of said converting means and to said third optical signal laser transmitter for converting electrical signals of said second one of said converting means to optical signals and a third optical fiber interconnecting said third optical signal laser transmitter and said optical signal receiver.

6. An optical signal transmission system as set forth in claim 5 wherein said second adapter comprises a low frequency filter coupled to said second one of said converting means for filtering out electrical signals at frequencies above a predetermined range and for supplying signals having frequencies in said predetermined range to service channels.

7. An optical signal transmission system as set forth in claim 1 further comprising a third optical signal laser transmitter and said first optical signal laser transmitter and said third optical signal laser transmitter are connected to said first optical fiber line by an optical coupler.

8. An optical signal transmission system comprising a first optical signal laser transmitter having first operating parameters, an optical signal receiver, a first optical fiber connected at one end to said first transmitter for receiving optical signals from said first transmitter, a second optical fiber, a first optical amplifier connected to one end of said second optical fiber for supplying optical signals to said second optical fiber and a second optical amplifier at the other end of said second optical fiber, said first optical amplifier having predetermined operating parameters different from said first predetermined operating parameters, a first adapter interconnecting the other end of said first optical fiber and said first optical amplifier and a second adapter interconnecting said second optical amplifier and said receiver, said first adapter comprising:

first converting means for converting optical signals to electrical signals connected to said other end of said first optical fiber for converting the optical signals received from said first transmitter into electrical signals corresponding to said optical signals;

a second optical signal laser transmitter connected to said first optical amplifier for supplying optical signals to said first optical amplifier; and a first adjustment module comprising first laser piloting means connected to said first converting means and to said second transmitter for controlling said second transmitter by said electrical signals within said operating parameters of said first optical amplifier; and said second adapter comprising:

second converting means for converting optical signals to electrical signals connected to said second optical amplifier for converting the optical signals received from said first optical amplifier by way of said second optical fiber into electrical signals corresponding to said optical signals;

a third optical signal laser transmitter;

a laser piloting circuit connected to said second converting means and to said third optical signal laser transmitter; and a third optical fiber connected to said receiver and to said third optical signal laser transmitter for supplying optical signals to said receiver.

9. An optical signal transmission system as set forth in claim 8 further comprising a fourth optical signal transmitter at said one end of said first optical fiber, said first optical fiber being connected to said first transmitter and said fourth transmitter by an optical coupler.

10. An optical signal transmission system as set forth in claim 9 further comprising switching means for selectively energizing said first transmitter and said fourth transmitter.

11. An optical signal transmission system comprising at least a first optical signal transmission system as set forth in claim 8 and a second optical signal transmission system as set forth in claim 9 and further comprising an optical switch connected to the first transmitter of said first optical signal transmission system and to the first transmitter of said second optical signal transmission system and also connected to the first optical fiber of said first optical signal transmission system connected to the first adapter of said first optical signal transmission system and to the first optical fiber of said second optical signal transmission system connected to a first adapter of said second optical signal transmission system for selectively connecting said first transmitter of said first optical signal transmission system to said first optical fiber of said first optical signal transmission system and to said first optical fiber of said second optical signal transmission system and selectively connecting said first transmitter of said second optical signal transmission system to said first optical fiber of said second optical signal transmission system and to said first optical fiber of said first optical signal transmission system whereby in the event of failure of a first adapter in one of said first optical signal transmission system and said second optical signal transmission system, said first transmitter of said one of said first optical signal transmission system and said second optical transmission system can be connected to said first optical fiber of the other of said first optical signal transmission system and said second optical signal transmission system.

12. An optical signal transmission system as set forth in claim 11 wherein one of said first transmitters is connected to a first optical fiber by an optical coupler.

13. An adapter group for interconnecting a first optical signal laser transmitter with an optical fiber, said adapter group comprising:
    converting means for converting optical signals to electrical signals and having an input for receiving optical signals from said first transmitter and an output for supplying electrical signals;
    a second optical signal laser transmitter having an input for receiving electrical signals and an output for supplying optical signals;
    an optical amplifier having an optical signal input connected to said output of said second optical signal laser transmitter and an optical signal output for supplying optical signals to said optical fiber; and
    an adjustment module comprising laser piloting means connected to said output of said converting means and to said input of said second transmitter for controlling said second transmitter by said electrical signals.

14. An adapter group for interconnecting an optical fiber with an optical signal receiver, said adapter group comprising:
    an optical amplifier having an optical signal input for receiving optical signals from said optical fiber and an optical signal output;
    converting means for converting optical signals to electrical signals and having an input connected to said optical signal output of said optical amplifier for receiving optical signals from said optical amplifier and an output for supplying electrical signals;
    an optical signal laser transmitter having an input for receiving electrical signals and an output for supplying optical signals to said receiver; and
    an adjustment module comprising laser piloting means connected to said output of said converting means and to said input of said transmitter for controlling said transmitter by said electrical signals.

15. An optical signal transmission system comprising a first optical signal laser transmitter having first operating parameters, a first optical signal receiver, a first optical fiber connected at one end to said first transmitter for receiving optical signals from said first transmitter, a second optical fiber, a first optical amplifier connected to one end of said second optical fiber for supplying optical signals to said second optical fiber and a second optical amplifier at the other end of said second optical fiber, said first optical amplifier having predetermined operating parameters different from said first predetermined operating parameters, a first adapter interconnecting the other end of said first optical fiber and said first optical amplifier and a second adapter and a third optical fiber interconnecting said second optical amplifier and said receiver, said first adapter comprising:
    first converting means for converting optical signals to electrical signals connected to said other end of said first optical fiber for converting the optical signals received from said first transmitter into electrical signals corresponding to said optical signals;
    a second optical signal laser transmitter connected to said first optical amplifier for supplying optical signals to said first optical amplifier; and
    a first adjustment module comprising first laser piloting means connected to said first converting means and to said second transmitter for controlling said second transmitter by said electrical signals within said operating parameters of said first optical amplifier; and
    said second adapter comprising:
    second converting means for converting optical signals to electrical signals connected to said second optical amplifier for converting the optical signals received from said second optical amplifier into electrical signals corresponding to said optical signals;
    a third optical signal laser transmitter, said third optical fiber interconnecting said third transmitter and said receiver;
    a second adjustment module comprising a laser piloting circuit connected to said second converting means and connected to said third optical signal laser transmitter for controlling said third transmitter by the electrical signal of said second converting means; and
    a second receiver at the location of said first receiver and said third transmitter connected to said third optical fiber by an optical coupler.

16. An optical signal transmission system as set forth in claim 15 wherein each said receiver has a signal output and further comprising switching means for alternately connecting the output of either receiver to a communication line.

17. An optical signal transmission system which includes a first optical signal laser transmitter having first operating parameters connected to a first optical fiber line for the supply of optical signals to said first optical fiber line, a second optical fiber line, and a first optical signal amplifier intermediate said first optical fiber line and said second optical fiber line for supplying optical signals to said second optical fiber line, said amplifier having second predetermined operating parameters different from said first predetermined operating parameters, and a first adapter interconnecting said first line with said first amplifier, said first adapter comprising:

- first converting means for converting optical signals to electrical signals connected to said first line for converting the optical signals received from said first transmitter by way of said first optical fiber line into first electrical signals corresponding to said optical signals;
- a second optical signal laser transmitter connected to said optical amplifier for supplying optical signals to said optical amplifier;
- a first adjustment module comprising a first laser piloting means connected to said first converting means and to said second transmitter for controlling said second transmitter by said electrical signals within said operating parameters of said first optical amplifier;
- a second optical amplifier connected to said second optical fiber line for receiving optical signals from said second optical fiber line;
- an optical signal receiver having predetermined operating parameters;
- a second said adapter comprising a second said converting means connected to said second optical amplifier for converting optical signals received from said second optical amplifier into second electrical signals corresponding to the optical signals received from said second optical amplifier, a third optical signal laser transmitter and a second adjustment module comprising a second laser piloting means connected to said second converting means and to said third optical signal laser transmitter for controlling said third optical signal laser transmitter by said second electrical signals within said predetermined operating parameters of said optical signal receiver; and
- a third optical fiber line interconnecting said third optical signal transmitter and said optical signal receiver.

* * * * *